United States Patent [19]

Fichte et al.

[11] Patent Number: 4,643,874
[45] Date of Patent: Feb. 17, 1987

[54] METHOD OF MAKING A TITANIUM-CONTAINING HYDROGEN STORAGE ALLOY

[75] Inventors: Rüdolf Fichte, Nuremberg; Hans-Joachim Retelsdorf, Zirndorf; Peter K. Künert, Oberasbach, all of Fed. Rep. of Germany

[73] Assignee: GfE Gesellschaft fur Elektrometallurgie mbH, Dusseldorf, Fed. Rep. of Germany

[21] Appl. No.: 715,188

[22] Filed: Mar. 22, 1985

[30] Foreign Application Priority Data

Mar. 24, 1984 [DE] Fed. Rep. of Germany ....... 3411011

[51] Int. Cl.$^4$ ................................................ C22C 1/00
[52] U.S. Cl. ................................... 420/417; 420/590; 420/900
[58] Field of Search .............. 420/590, 900, 417, 418, 420/420, 580, 581

[56] References Cited

U.S. PATENT DOCUMENTS 4,079,523  3/1978  Sandrock ............................... 34/15

*Primary Examiner*—Christopher W. Brody
*Attorney, Agent, or Firm*—Karl F. Ross; Herbert Dubno

[57] ABSTRACT

Titanium-containing hydrogen storage alloys with a Laves phase composition $AB_2$ are made in which the A component is titanium and possibly an element from the start of the transition metal groups of the Periodic Table. According to the invention a titanium-free prealloy is first formed and this prealloy is comminuted and smelted again with addition of titanium and possibly zirconium in a second vacuum furnace stage. The latter melt is then deoxidized with cerium mischmetal. Hydrogen storage capacities of about 2% by weight and above that conventionally obtained can be made.

3 Claims, No Drawings

METHOD OF MAKING A TITANIUM-CONTAINING HYDROGEN STORAGE ALLOY

FIELD OF THE INVENTION

Our present invention relates to a method of making a titanium-containing alloy for the storage of hydrogen and, more particularly, to improvements in the making of titanium-containing Laves phase alloys for hydrogen storage.

BACKGROUND OF THE INVENTION

It has been known for some time that transition metal alloy systems and especially titanium-containing alloys, particularly Laves phase alloys $AB_2$, in which A represents a component which includes titanium and possibly another element from the early part of the transition elements and B represents an element from the later part of the transition elements of the Periodic Table, can be utilized effectively as a hydrogen storage medium. Such compositions are utilized for the safe storage of hydrogen, e.g. for use as fuels, the composition being charged with hydrogen and therafter serving as a source for the controlled release of hydrogen in a manner which is safer than that which obtains when the hydrogen is supplied from high pressure cylinders or the like.

In such compositions, the elements are so chosen that the atomic radius ratio $r_A/r_B$ is between 1.05 and 1.68, $r_A$ representing the atomic radius of atoms of the elements constituting the A component, namely, titanium and at least one other element from the beginning of the transition metal series of the Periodic Table while $r_B$ represents the atomic radius of the elements of the B component, i.e. one or more elements from the remainder of the transition metal series of the Periodic Table.

In the past such alloys have been made by preparing the elements in sufficient purity and then smelting them in a vacuum furnace and/or under protective gas to form a prealloy.

The prealloy is then comminuted and subjected to smelting again in the vacuum furnace in a second stage of the process.

The hydrogen storage alloys which result thus have intermetallic phases which are equivalent to chemical compounds formed between the components with stoichiometric proportions of the components characterized by the overall relation $AB_2$. A and B can each be a single element or can represent a group of elements and such stoichiometry exists between the sum of the elements of one group and the sum of the elements of the second group when the ratio of the atomic radii alloy within the range given.

These compounds or intermetallic phases crystallize in a so-called C-14 structure, which has an especially dense atomic packing and together with C-15 and C-36 structures in the crystal composition has been designated as a Laves phase structure.

The elementary cell of the C-14 structure is hexagonal and contains four A-component atoms and eight B-component atoms. The compounds have a metallic appearance and typical compositional characteristics and properties of such hydrogen storage alloys which are given below.

It should be clear that an entire collection of hydrogen storage alloys of this type has been developed, these alloys including apart from titanium and manganese, which are the components present in practically all of them, vanadium, chromium and iron and/or aluminum.

These alloys are characterized by a high hydrogen storage capacity which can exceed 2% by weight $H_2$. The hydrogen storage capacity is defined as the difference in weight percent $H_2$ between the hydrogen uptake at room temperature and 50 bar $H_2$ pressure and the residual $H_2$ content at 60° C. and 1 bar $H_2$ pressure.

It is important for the use of such alloys as sources of hydrogen, that the pressure plateau over the concentration range be as horizontal as possible and that this horizontal stretch be maintained over a wide concentration interval.

In the past, hydrogen storage capacities in the high level of say to 8% $H_2$ have generally been achieved only under extreme conditions in laboratory tests and generally are not realizable in large scale practice.

In German open application DE-OS 30 23 770, which describes the prior art method discussed above, all of the constituent elements including titanium are already present in the first stage melt. The first stage product is a prealloy only in the physical sense with respect to structure and possibly disadvantageous homogeneity characteristics since it already has the chemical composition of the final alloy so that the term "prealloy" may be a misnomer.

After comminution, the composition is smelted again and the second smelting stage serves mainly for homogenization having little effect on the alloy composition although it has an important effect in providing the hydrogen storage capacity. It appears that this two-stage process ensures an especially low oxygen content and this contributes to the improvement in the hydrogen storage capacity since oxidic impurities appear to be detrimental to the hydrogen storage capacity.

Naturally, this also requires that the starting materials be extremely pure.

For the production of hydrogen-rich alloys, it is desirable to make use of commercially available metals and alloys, especially titanium sponge, zirconium sponge, electrolytic manganese, ferrovanadium, vanadium metal, electric furnace or electrolytic iron, cerium mischmetal and vanadium-aluminum alloys. All of these elements can be produced by conventional smelting metallurgy or powder metallurgy, but must be treated in vacuum and/or under protective gas for smelting or sintering.

The smelting units include induction furnaces, electric-arc furnaces and electron-beam furnaces and, to avoid the incursion of impurities, it is preferred to operate in a crucible-free mode thereby avoiding reactions with the crucible materials.

Impurities in the form of oxide products, such as $Al_2O_3$, but even carbon, have been found to reduce the quality and adversely affect the hydrogen storage capacity.

Best results are thus obtained when one makes use of an electric arc furnace and carries out the smelting in a protective gas with the second stage smelting being effected in a water-cooled copper ingot mold.

In spite of all of these efforts, however, one generally obtains a hydrogen storage composition as the product which has a relatively high oxygen concentration. As a result, the hydrogen storage capacity is significantly lower than the aforementioned goal of two weight percent hydrogen.

If one does not take the precautions described above to ensure deoxidation of the alloy, the oxygen content can range from 0.4 to 0.6 weight percent with a corresponding reduction in the hydrogen storage capacity.

Our tests have shown that deoxidation to reduce the oxygen/oxide content of the alloy is highly problematical because the removal of the partially solid and partially viscous deoxidation products from the melt is extremely difficult.

OBJECTS OF THE INVENTION

It is the principal object of the present invention to provide a method of producing such hydrogen storage alloys such that, even for large-scale production of the products, it is possible to obtain a hydrogen storage capacity which greatly exceeds those which have been considered acceptable up to now and which may even lie at or above 2 weight percent hydrogen.

Another object of the invention is to provide an improved method of making such alloys so that drawbacks of earlier systems can be obviated.

DESCRIPTION OF THE INVENTION

These objects and others which will become apparent hereinafter are attained, in accordance with the present invention, with a method for producing the hydrogen storage compositions and wherein, in the first stage, a practically titanium-free prealloy is provided from the elements of the composition exclusive of titanium and is smelted, this prealloy being thereupon comminuted to provide a powdered solid and smelted in a second stage with titanium and any required additional elements which serve solely to correct the composition to the desired proportions of the elements in the finished product.

This latter melt is then deoxidized by the addition of cerium mischmetal.

When the hydrogen storage alloy apart from titanium comprises mainly manganese, we prefer in the first process stage to form a MnVFe alloy from electrolytic manganese, ferrovanadium and any other component elements of the final product, the resulting prealloy being comminuted and smelted with the titanium being added in the form of titanium sponge.

When the A component consists of titanium together with zirconium, the zirconium is advantageously also added in the second stage rather than the first stage.

In the first stage, the smelting is advantageously carried out at a temperature of about 1400° C. while the temperature in the second stage and for the deoxidation with the cerium mischmetal should be about 1300° C. and both smeltings are most advantageously carried out in a vacuum induction furnace.

The invention is based upon our most surprising discovery, that by confining the presence of titanium to the second stage, i.e. making the outer prealloy in the first stage which mechanically differs from the ultimate composition, the product does not require deoxidation steps that are achieved by the addition of cerium mischmetal, and for some reason oxygen inclusions even prior to the point that the cerium mischmetal is added are comparatively minor.

The invention provides a simplified way of ensuring that there will be a low oxygen content in the composition or for effecting deoxidation to eliminate oxygen and oxides from the composition.

For example, if the first stage alloy, i.e. the prealloy, consists substantially of about 60 to 65% by weight manganese and about 30% (±5%) by weight vanadium, balance iron (7%±3%), the resulting MnVFe alloy is found to have an oxygen content of only 0.02 to 0.03% by weight and this is not increased and in fact is decreased by the subsequent addition of titanium in the second stage, and by the cerium mischmetal deoxidation subsequently.

The deoxidation carried out on the second stage product does not bring about a significant reduction in the oxygen content or any significant increase in the hydrogen storage capacity but it does appear to guarantee that one can obtain a storage capacity in large scale production of the composition which is 2% by weight ±0.05% $H_2$.

The process of the invention thus brings about not only a high hydrogen storage capacity but one which remains constant over time for long periods and has a substantially horizontal and well defined plateau over the concentration range with a large concentration interval or range.

SPECIFIC EXAMPLES

EXAMPLE 1

An $AB_2$ type alloy of the following composition was prepared:

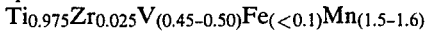

This corresponds to the approximate composition in weight percent of:

Ti: 28.8%
Zr: 1.4%
V: 15.0%
Fe: 3.4%
Mn: 51.3%

The alloy is produced in two stages in a vacuum induction furnace. In the first stage, electrolytic manganese metal and ferrovanadium containing 80% vanadium are smelted to produce an alloy containing 62% Mn, 30% V and 8% Fe without concern for impurities which may have been introduced in the process.

First the electrolytic manganese is smelted and then the comminuted ferrovanadium is charged into the melt. The resulting alloy has the following exact composition:

60.9%: Mn
30.6%: V
6.9%: Fe
0.25%: Al
0.04%: O
0.03%: N

This MnVFe alloy is then comminuted and mixed with the required quantity of electrolytic manganese metal required for the second stage 50% of the mixture is fed to the melting crucible and the entire quantity of manganese added and used to cover the remaining charge of the mixed components.

Smelting is effected under 100 to 400 torr argon. The melt is held at a temperature of 1400° C., slightly above the liquidus temperature. After smelting of the entire charge, the titanium metal is introduced in the form of titanium sponge over a minimum time period.

The titanium addition drops the liquidus temperature of the melt.

The furnace power is then reduced to that the temperature during melting and titanium addition is limited to about 1320° C. After smelting of the titanium, 2% by weight cerium mischmetal is added to deoxidize the melt. The melt is cast in steel ingot mold under an argon protective atmosphere at about 400 torr. Used was the following mixture:

Zirconium: 0.47 kg
Ti: 10.06 kg
Manganese: 6.98 kg
VMnFe: 17.46 kg
cerium MM (mischmetal): 0.7 kg The yield was 31.35 kg of the composition which had the following analysis:
Ti: 28.5%
Zr: 1.24%
V: 14.90%
Fe: 3.37%
Mn: 45.95%
Al: 0.28%
Cerium MM (mischmetal): 0.55%
O: 0.03%
N: 0.02%

Hydrogen storage capacity tests give a value of 2.04% by weight hydrogen.

EXAMPLE 2

An alloy of the following composition is produced:
$Ti_{0.98}Zr_{0.02}V_{0.4}Fe_{0.05}Cr_{0.05}Mn_{1.5}$ This alloy corresponds to the general composition $(Ti,Zr)(V,Fe,Cr,Mn)_2$ where the A component is Ti, Zr, and the B component is V, Fe, Cr, Mn.

The raw materials are titanium sponge, zirconium metal, electrolytic manganese, chromium metal produced aluminothermal cerium mischmetal in wire form and ferromanganese 80%.

The two-step process is used as in Example 1. For the first stage, a V, Mn, Fe prealloy is formed with the following composition by weight:
60.61%: Mn
30.83%: V
0.5%: Al
6.62%: Fe
0.023%: O
0.018%: N The second stage utilizes the smelting process as described in Example 1 and is followed by a deoxidation with 1% cerium mischmetal. The materials combined for smelting in the secnd stage are: 4.35 kg titanium, 3.63 kg manganese, 6.59 kg of the VMnFe prealloy from the first step, 0.17 kg zirconium, 0.24 kg chromium, 0.15 kg cerium mischmetal.

The yield was 13.0 kg of an alloy with the following analysis by weight:
28.95%: Ti
1.08%: Zr
13.50%: V
3.10%: Fe
1.70%: Cr
50.70%: Mn
0.29%: Al
0.07%: Si
0.06%: C
0.16%: Cerium MM (mischmetal)
0.05%: O
0.02%: N The composition in terms of atomic ratio (calculated) is as follows:

| | |
|---|---|
| Ti | 0.980 |
| Zr | 0.019 |
| V | 0.430 |
| Fe | 0.090 |
| Cr | 0.053 |
| Mn | 1.498 |
| | 3.070 |

The alloy has a hydrogen storage capacity of 1.96% $H_2$.

EXAMPLE 3

The hydrogen storage alloy which is produced has the following composition:
$Ti_{0.85}Zr_{0.15}V_{0.45}Fe_{0.11}Mn_{1.55-1.60}$ The raw materials used were the same as those in Example 2 and the Mn, V, Fe prealloy which is made in step 1, otherwise similar to the first step previously carried out, has the following analysis by weight:
60.90%: Mn
30.60%: V
0.23%: Al
0.29%: Si
6.86%: Fe
0.04%: O
0.03%: N The second stage is carried out following the procedure given in Example 2 with the following amounts of materials:
Titanium: 3.56 kg
Manganese: 3.26 kg
Zirconium: 1.2 kg
VMnFe-Alloy: 6.96 kg
Cerium mischmetal: 0.09 kg 14.4 kg of an alloy of the following analysis is obtained:
Ti: 23.80%
Zr: 6.05%
V: 13.80%
Fe: 3.20%
Mn: 50.10%
Al: 0.26%
Si: 0.17%
C: 0.04%
Cerium MM: 0.13%
O: 0.04%
N: 0.01%

Calculating this composition in terms of atomic ratio, one obtains:

| | |
|---|---|
| Ti | 0.082 |
| Zr | 0.117 |
| V | 0.480 |
| Fe | 0.101 |
| Mn | 1.619 |
| | 3.199 |

The alloy has a hydrogen storage capacity of 2.01% $H_2$.

EXAMPLE 4

The hydrogen storage alloy has the following composition:
$Ti_{1.0}V_{(0.6-0.65)}Fe_{0.1}Mn_{(1.30\pm0.04)}$ This corresponds to a composition in weight percent of:
Ti: 30%
V: 20%
Fe: 4.5%
Mn: 45%

The raw materials used in Example 2 and the two-stage process of Example 2 was followed.

The MnVFe prealloy formed in the first stage had the following analysis:
Mn: 60.61%
V: 30.83%
Fe: 6.62%
O: 0.023%
N: 0.018%

The following melts were combined for the second stage:
9.36 kg: MnV-Fe-Alloy
4.52 kg: Titanium
1.00 kg: Manganese
0.12 kg: Iron
0.30 kg: Cerium Mischmetal The cerium mischmetal amount corresponded to an amount of 2% for deoxidation.

12.5 kg of an alloy was obtained with the following composition:
Ti: 30.0
V: 19.2
Fe: 5.0
Mn: 45.1
Al: 0.34
Si: 0.23
C: 0.05
Cerium MM: 0.85
O: 0.03
N: 0.01

Calculated as to atomic ratio this gives:

| | |
|---|---|
| Ti | 1.000 |
| V | 0.601 |
| Fe | 0.142 |
| Mn | 1.311 |
| | 3.054 |

The alloy has a hydrogen storage capacity of 2.05%.

EXAMPLE 5 (COMPARATIVE TEST)

The alloy of Example 4 is made in a one-stage process by combining in a single melt, i.e. using ferrovanadium with 80% vanadium as follows:
4.60 kg: Titanium
3.75 kg: Ferro-V 80
6.60 kg: Manganese
0.08 kg: Iron
0.45 kg: Cerium Mischmetal The cerium mischmetal content corresponds to an addition of 3% for deoxidation purposes.

The exact composition of the ferro-V 80 is 78.8% by weight vanadium, 0.89% silicon, 0.82% aluminum and 0.9% oxygen.

All of the components listed are mixed in a vacuum induction furnace crucible and smelted under an argon protective gas pressure of 100 mbar. Overheating of the melt was avoided and after smelting, the 3% cerium mischmetal deoxidation was carried out.

The deoxidation products were difficult to remove and adhered to the crucible in part so that the crucible could not be used for another melt. About 13.6 kg of the alloy was obtained and about 1.53 kg of dross.

The alloy had the following composition in weight percent:
30.50%: Ti
19.70%: V
4.30%: Fe
43.90%: Mn
0.42%: Al
0.10%: Si
0.03%: C
0.51%: Cerium MM
0.26%: O
0.02%: N The hydrogen storage capacity was 1.85% by weight hydrogen. The hydrogen storage capacity improvement of the invention could thus be in excess of 10%.

We claim:

1. A method of making a titanium-containing hydrogen storage alloy of a Laves phase $AB_2$ composition wherein A represents a component selected from the group which consists of titanium and titanium with at least one further element from the beginning of the transition metal series of the Periodic Table and B represents at least one element different from those constituting component A and selected from the group of elements constituting the remainder of the transition metals of the Periodic Table and wherein the atomic radii ratio of the atomic radii $r_A$ of an element of component A and $r_B$ of an element of the component B is substantially $$1.0 \leq r_A/r_B \leq 1.68,$$

which comprises the steps of:
(a) smelting a substantially titanium-free melt from at least most of the elements of the hydrogen storage alloy with the exception of titanium in a vacuum furnace or under protective gas at a temperature of about 1400° C. and forming a titanium-free prealloy therefrom;
(b) comminuting the prealloy to provide a powdery solid;
(c) thereafter combining the comminuted prealloy with titanium and amounts of remaining elements of the hydrogen storage alloy sufficient only to correct the composition to the desired proportions of the elements in said composition;
(d) melting the resulting composition in a vacuum furnace at about 1300° C. in a vacuum furnace to form a melt;
(e) deoxidizing the melt formed in step (d) with cerium mischmetal at the temperature at which the composition is melted in step (d); and
(f) solidifying the melt deoxidized in step (e) to said Laves phase $AB_2$ composition.

2. The method defined in claim 1 wherein, in step (a) and (b), a MnVFe prealloy is formed from at least electrolytic manganese and ferrovanadium and this prealloy is combined with titanium sponge in said second step.

3. The method defined in claim 1 wherein said component A consists essentially of titanium and zirconium, said zirconium being added in step (c).

* * * * *